United States Patent
Peternel

[11] 3,839,000
[45] Oct. 1, 1974

[54] METHOD FOR CONTROLLING CURVATURE OF REGIONS IN A SHAPED THERMOPLASTIC SHEET
[75] Inventor: Jacob R. Peternel, Pittsburgh, Pa.
[73] Assignee: PPG Industries, Inc., Pittsburgh, Pa.
[22] Filed: Feb. 20, 1973
[21] Appl. No.: 333,603

[52] U.S. Cl.......................... 65/29, 65/106, 65/162, 65/273
[51] Int. Cl............................................. C03b 23/02
[58] Field of Search ............ 65/106, 162, 273, 275, 65/29

[56] References Cited
UNITED STATES PATENTS
3,257,188   6/1966   Morgan et al. .................. 65/107 X
3,744,985   7/1973   Peternel............................ 65/106 X Primary Examiner—Arthur D. Kellogg
Attorney, Agent, or Firm—Donald Carl Lepiane; Edward I. Mates

[57] ABSTRACT

This invention relates to a method of controlling curvature of regions in a shaped thermoplastic sheet. More particularly, it relates to producing bent glass sheets on a mass production basis by passing a series of glass sheets through a heated furnace and then bending each successive sheet to shape by press bending. Temperature measurements are made on a selected portion or portions of selected heat-softened sheets to provide a profile of reference temperatures. After the sheet is shaped and allowed to cool, the radius of curvature errors of selected regions in each of said portions is determined. The magnitude of these errors and the deviation of said reference temperatures from target temperatures determined for said portions determines the nature of one or more changes that are made in one or more parameters of the mass production operation.

In a preferred specific embodiment, a composite temperature is determined for each portion from formulae based on reference temperatures of the selected portions. A selected composite temperature, one that provides a desired radius of curvature error in the regions of each selected portion, is determined for each of the portions of the sheet. A target temperature for each of the portions is determined from the selected composite temperature of the respective portions to give a desired radius of curvature error in the regions. According to a specific preferred embodiment of this invention, the parameter of the operation that is changed is the heat pattern in the furnace, which is altered in response to the data derived from reference temperature readings and radius of curvature errors determined with calculated target temperatures and desired values of radius of curvature errors, respectively, to cause subsequent heat-softened sheets to be heated in such a manner that the temperatures at the different portions approximate the target temperatures calculated from the selected composite temperatures.

12 Claims, 5 Drawing Figures

METHOD FOR CONTROLLING CURVATURE OF REGIONS IN A SHAPED THERMOPLASTIC SHEET

BACKGROUND OF THE INVENTION

1. Field of the Invention

This invention relates to a method of controlling curvature of selected regions of heat-softened thermoplastic sheets.

2. Description of the Prior Art

It has long been recognized that control of glass temperature is essential in press bending processes, particularly in a vertical press bending process. In the aforesaid process, a succession of glass sheets is conveyed through a tunnel-type furnace. The furnace is divided into a series of zones extending in end-to-end relation along its length. The glass sheets are supported in an upright orientation, preferably by tongs that grip the glass sheets near their upper edge. The tongs are suspended from cars or carriages that are propelled along a track extending the entire length of the furnace and into a further processing station. Heating elements in the form of gas burners or electrical heating coils are arranged in opposed pairs of sets of heating elements to heat the moving glass sheets by irradiation. The heating elements in each zone have their heat input controlled in coordination with the speed of movement of glass sheets through the furnace to help each glass sheet arrive at the press bending station at a deformation temperature.

At the press bending station, each successive heat-softened glass sheet, still suspended from tongs, is pressed between a pair of shaping molds to press bend the sheet to a desired shape, then chilled rapidly to impose a temper on the glass. Subsequently, the bent and tempered glass sheet is released from the tongs and deposited on a peg-type conveyor of the type disclosed in U.S. Pat. No. 3,412,841 to Paul Couch and Richard N. Pytel. The sheet is cooled to handling temperature while supported on the peg-type conveyor.

Each cooled shaped glass sheet is then positioned on an inspection fixture of the type disclosed in U.S. Pat. application Ser. No. 57,576, filed on July 23, 1970, in the name of A. W. Farabaugh and entitled "Method and Apparatus for Determining Contours of Objects, Especially of Glass" to measure the deviation from a reference surface for each of a number of selected points on the glass sheet.

Those regions of the press-bent glass sheets that have been heated to too high a temperature will relax toward flatness during their cooling from the temperature at which they are shaped to handling temperature. These glass sheets will appear too flat compared to the inspection fixture and have a deviation value expressed in one sense. Those regions of the glass sheets that have not been heated sufficiently resist deformation during cooling. Such latter regions will appear to be overbent compared to the inspection fixture and have a deviation value expressed in the opposite sense. The operator studies the measured deviation values and uses his expertise to make adjustments to the heating elements of the furnace and/or change the speed of glass sheet movement through the furnace to reduce the measured deviation values of glass sheets processed subsequent to the deviation measurements.

The prior art method of controlling the shape of glass sheets has several drawbacks, two of which are: (1) adjusting the furnace to control the overall contour of the glass sheet based on a series of point measurements, and (2) relying on the operator's expertise to make adjustments to the furnace.

The heating elements of the furnace are arranged to face different glass sheet portions to heat the corresponding portions of the glass sheet and not isolated points on the glass sheet. Adjustments to the heating elements to optimize the heating of the glass sheets in the furnace should therefore be made based on data obtained from comparing the curvature actually produced with a desired curvature in a region, and not from data obtained from measuring the deviation from a desired curvature at selected points of the glass sheet. The prior art technique of controlling deviation of the glass curvature from its desired curvature at selected points only does not necessarily provide adequate control of curvature in the glass sheet between the points where deviations are measured. In fact, a deviation at a particular point may result from a departure in shape from a desired configuration in a region spaced a considerable distance from the point where the deviation is measured. Hence, the prior art lacked a good guide to assist an operator to correct a departure from the desired shape of a given sheet.

Another drawback in the prior art technique of controlling the shape of the glass sheets is that adjustments to the heating elements were made based on the operator's expertise. As can be appreciated, a fabrication operation, such as controlling the shape of glass sheets based on an operator's expertise is inefficient, costly and inconsistent. It is inefficient because the judgment of the operator can be wrong because it is subjective rather than objective. It is costly because of the time and product lost in order that the operator gain his expertise. Furthermore, no two operators have the same expertise and, since different persons operate on different shifts, the operation is inherently inconsistent from shift to shift. It would therefore be advantageous if a systematic method were available to control the shape of glass sheets that eliminates dependence on operator expertise.

SUMMARY OF THE INVENTION

This invention comprises a method of controlling the contour of at least one region in at least one portion of a shaped sheet of thermoplastic material, there being a plurality of regions in each said portion. The deviation from a reference surface of selected points on the sheet is measured for said selected points in each of said regions. The radius of curvature of the selected points of each of the regions studied is determined from the deviations measured for said selected points associated with each region. The radii of curvature so determined are compared with the corresponding radii of the reference surface and any differences are termed "radius of curvature error". Thereafter, one or more parameters of the shaping operation is changed in such a direction that subsequent sheets are shaped in such a manner as to obtain in each of said selected regions a radius of curvature error of a desired magnitude consistent with tolerance requirements of customers.

More specifically, this invention comprises a method of controlling the curvature of one or more selected regions of a shaped thermoplastic sheet whose shape is altered by a mass production operation. The sheet is shaped by first heat softening the sheet, measuring the temperature of at least one region in at least one portion of the heat-softened sheet to obtain a reference temperature for said region or regions, and thereafter shaping the heat-softened sheet into a desired shape. The improved method includes measuring the radius of curvature error of said region or regions in said portion or portions of the shaped sheet. A selected composite temperature, i.e., a composite temperature for said portion or portions that gives said region or regions a desired radius of curvature error, is determined. Thereafter, a target temperature for said region or regions is determined from the selected composite temperatures. Subsequent sheets are heat softened in such a manner that the temperature measured approximates the target temperature.

Compensations in heating pattern based on the radius of curvature error value for one or more regions according to one aspect of the present invention instead of those based on deviation measured at one or more points as taught in the prior art correct the contour of a region of the sheet that is improperly bent because the data on radius of curvature is available for each selected region and can be corrected if known. Compensating for deviations of selected measuring points on the sheet to reduce said deviations at the selected points only does not necessarily provide control of the shape of the sheet in regions requiring change in contour. Without any control of shape other than at selected points, the task of controlling contour of a sheet to within tight tolerances is almost impossible.

In the prior art, the process of shaping sheets was controlled by the operator's expertise. The present invention no longer relies on operator knowhow or subjective operator judgment. More particularly, the present invention determines a radius of curvature error for each selected region in each selected portion and establishes a relationship between the radius of curvature error for the region and a composite temperature of the portion in which the regions lie. The determining and establishing steps are repeated for other selected portions. A selected composite temperature, that is, a composite temperature to give a region or regions in the selected portion a desired radius of curvature, is determined from the relationship of composite temperatures and radius of curvature errors.

In a typical specific operation for producing bent automobile sidelights the radius of curvature error is determined for each of three regions (the leading edge region, the central region and the trailing edge region) for each of three portions of typical sheets (the top portion, the center portion and the bottom portion). Reference temperatures are periodically taken at each portion of typical sheets and used in the calculation of a composite temperature for each selected portion. The composite temperature for each portion is compared to the radius of curvature error of selected regions in said portion. These data of radius of curvature errors and composite temperature are used to determine selected composite temperature for each portion. The selected composite temperature is then used to determine target temperatures for the top, center and bottom portions of the sheets to be bent subsequently to yield a desired radius of curvature error in each region of said portion. The target temperatures of the sheet portions so determined are compared with the reference temperatures and the heating elements in the furnace facing the respective glass sheet portions are adjusted to change the reference temperatures of the respective portions of said subsequent sheets so that they are more nearly equal to the target temperatures of the portions so determined from the selected composite temperatures.

Under certain circumstances, an operator may alter other parameters of the shaping operation. For example, if all reference temperatures measured are greater than the respective target temperatures, an operator may increase the speed of glass sheet movement through the furnace sufficiently to have the reference temperatures of subsequent sheets approximate the respective target temperatures, and if reference temperatures are less than the respective target temperatures, said speed may be reduced. In addition, an operator may alter a combination of parameters controlling the shaping operation.

While the present invention is suitable for use in shaping any thermoplastic material more precisely, it was originally developed for the production of precisely curved glass sheets.

It is also possible to use certain selected parameters of the present invention to guide the alteration of the shaping face of a press bending mold to improve the accuracy of shape of thermoplastic sheets produced by a mass production operation. A copending U.S. Pat. application Ser. No. 358,760 filed May 9, 1973, in the names of John R. Petrella, John N. Shaw, and Jacob R. Peternel and entitled "Method of Controlling the Shape of Thermoplastic Sheets" is referred to for further details of this other method of improving the precision of shape imparted to mass produced shaped sheets.

DETAILED DESCRIPTION OF THE INVENTION

Figure 1:
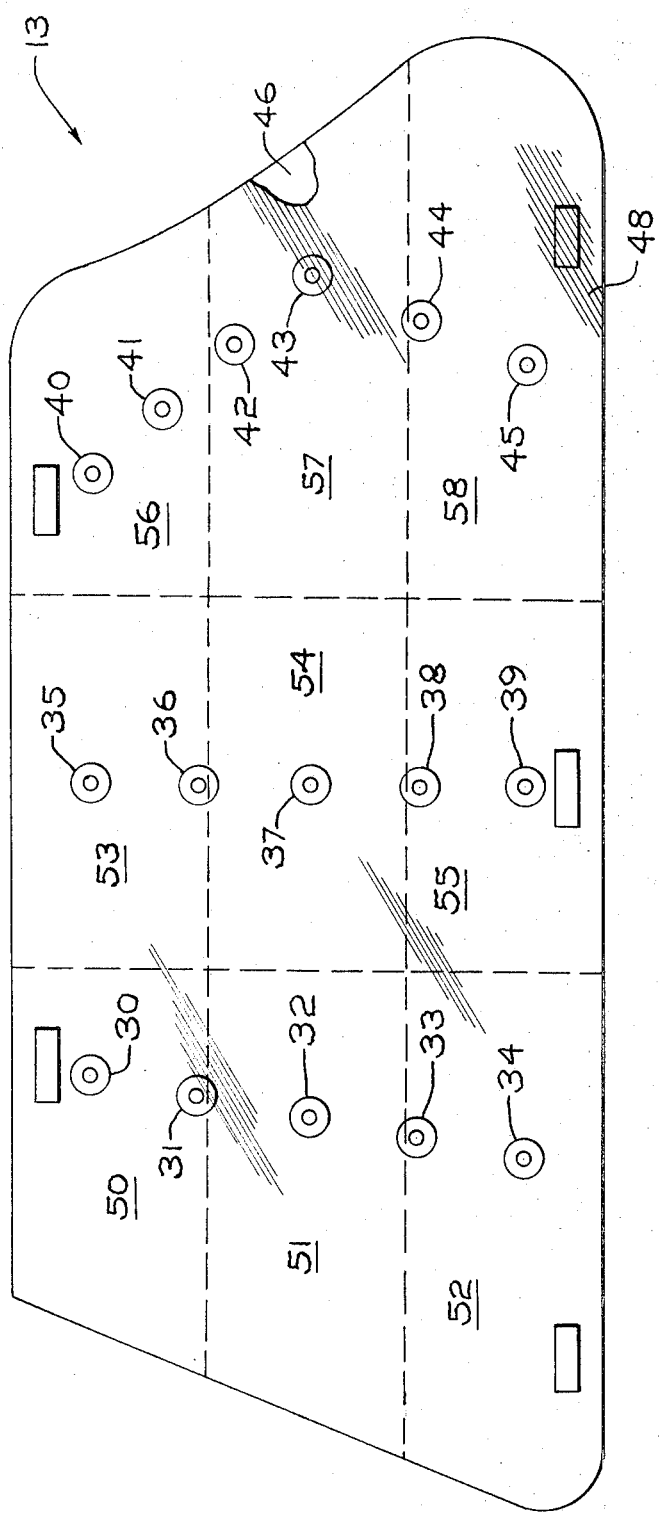
FIG. 1 is a front elevational view of an inspection fixture that may be used to practice the method of this invention.

As stated previously, the present invention relates to a method of systematically controlling radius of curvature errors of selected regions of a shaped thermoplastic sheet, such as a sheet of glass used for automobile sidelights or backlights. A preferred illustrative embodiment of the present invention follows to clarify its nature.

In general, radius of curvature errors of regions of a shaped sheet of glass are controlled by (1) measuring the temperature of one or more selected portions of each sheet of a group of heat-softened sheets as each sheet passes a temperature sensing station just outside a furnace to determine a reference temperature for a top portion of the sheets $(T_T)$, for a center portion of the sheets $(T_C)$ and for a bottom portion of the sheets $(T_B)$; (2) measuring the radius of curvature errors of selected regions in the top portion, center portion and bottom portion of shaped sheets selected from the group; (3) determining a target temperature to be attained by the top portion, center portion and bottom portion of subsequently heat-softened sheets at said temperature sensing station so that the regions have a desired radius of curvature error; and (4) adjusting the furnace so that the measured temperatures at the top portion, center portion and bottom portion of subsequently heat-softened sheets are approximately the target temperature at said temperature sensing station. The present invention has determined that the regions have a desired radius of curvature when the temperatures of said portions approximate said target temperature at said temperature sensing station.

A type of furnace and press bending station that may be used in the practice of this invention is disclosed in U.S. Pat. application Ser. No. 150,986, filed on June 8, 1971, in the name of J. R. Peternel and entitled "Method and Apparatus for Controlling Temperature of Conveyed Glass Sheets now U.S. Pat. No. 3,744,985.

The preferred first step of the method of this invention is to measure the temperature of heat-softened sheets at preselected points on selected heat-softened sheets to establish a reference temperature for each selected portion, such as a top portion, a center portion and a bottom portion, of the sheet. The reference temperatures are preferably measured as the sheets pass a temperature sensing station immediately beyond the exit of the furnace and prior to moving the sheet into the press bending station.

The hereinabove mentioned U.S. Pat. No. 3,744,985 discloses a method for determining a different reference temperature for each portion of each heat-softened sheet of glass. The reference temperatures so determined may be used to practice the present invention.

In general, temperature measurements are made at a preselected position spaced along the path of sheet travel rearward of the leading edge of each heat-softened sheet of a set of successive sheets leaving the furnace. A top portion temperature is measured on the first sheet, a center portion temperature is measured on the second sheet, and a bottom portion temperature is measured on the third sheet of a set of three successive sheets, for example. The reference temperature for the top portion is determined by averaging the temperature readings on the first, fourth and seventh sheets; for the center portion, by averaging the temperature readings of the second, fifth and eighth sheets; and for the bottom portion, by averaging the temperature readings of the third, sixth and ninth sheets of a set of nine successive sheets that pass the temperature sensing station. As a temperature measurement is taken for a portion of a later arriving glass sheet, the fourth most recent temperature reading for that portion is dropped and the latest three temperature readings of said portion are averaged. For example, after the temperature of the top portion of the tenth sheet to arrive at the position has been taken, the reference temperature of the top portion is determined by averaging the temperature of the fourth, seventh and tenth sheets. In other words, the reference temperature for any portion is the running average of the three most recent temperature determinations for said portion at said temperature sensing station.

As can be appreciated by those skilled in the art, other methods for determining average temperature of selected portions of heat-softened sheets may be used. For example, the top portion temperature, center portion temperature and bottom portion temperature may be taken on each sheet. Further, the average may include more or less than three temperatures. Still further, temperature may be measured at more than one point in each portion and thereafter the measured temperatures may be either averaged to determine a reference temperature for each portion or the temperatures measured at selected regions may be averaged to determine a reference temperature for each selected region in each portion.

Although the method of this invention may be practiced by using a reference temperature for each portion that is not an average temperature but a temperature of the top, center and bottom portions of one sheet, it is recommended that an average temperature be used as a reference temperature for each portion so as to minimize variations in temperature of the glass due to thickness variations between individual sheets and random variations in furnace characteristics that are difficult to control.

Another step in the method of the present invention is to determine radius of curvature error for each selected region in the top, center and bottom portions of a sheet of glass selected from the first group, such as sheets 1 to 9, or a sheet closely spaced therefrom. It is preferred to select a sheet from the group of sheets the temperature measurements of which were used to determine the reference temperature of a portion.

There are several different methods to determine the radius of curvature for regions of the glass sheet. An inspection fixture and procedure which has proven satisfactory will be described next.

Referring to FIG. 1, an inspection fixture 13 has a plurality of linear potentiometers 30–45, each mounted on a support 46 in a manner disclosed in U.S. Pat. application Ser. No. 57,576, filed on July 23, 1970, in the name of A. W. Farabaugh and entitled "Method and Apparatus for Determining Contours of Objects, Especially of Glass now U.S. Pat. No. 3,733,704". U.S. Pat. No. 3,733,704 illustrates potentiometers mounted on the perimeter of a frame-type support, whereas in FIG. 1 of this application, the potentiometers are selectively mounted throughout the extent of the support. However, the manner of mounting and operating the linear potentiometers are as discussed in said U.S. Pat. No. 3,733,704.

As shown in FIG. 1, the potentiometers are arranged to define four groups of potentiometers, namely, Group I comprising potentiometers 30 to 34, Group II comprising potentiometers 35 to 39, Group III comprising potentiometers 40 to 43, and Group IV comprising potentiometers 43 to 45. The potentiometers in each group are arranged in a straight line and adjacent potentiometers in any group are spaced equal distances from each other.

As will be appreciated by those skilled in the art, the potentiometers need not be in a straight line. However, it has been found that when the potentiometers of each group are not in a straight line, any variation in the orientation of the glass sheet on the fixture due to pivoting of the glass about an axis causes a change in the potentiometer reading, which change will result in an inaccurate calculation of radius of curvature. This error in calculation is avoided when the potentiometers in a given group are linearly aligned. Also, the potentiometers in a group need not be spaced equidistant from each other. However, spacing the potentiometers in a group equidistant from each other facilitates the calculation of radius of curvature. In addition, the number of groups of potentiometers is arbitrary and depends on the size and shape of the sheets being produced. For a sheet of glass shaped as shown in FIG. 1, four groups of potentiometers arranged as shown in FIG. 1 has proven satisfactory.

The inspection fixture 13 is divided into nine regions, namely, regions 50 through 58, which correspond to portions of a glass sheet 48. Regions 50, 53 and 56 are in a first portion; regions 51, 54 and 57 are in a second portion; and regions 52, 55 and 58 are in a third portion of the fixture 13. The first portion of the fixture faces the top portion of the sheet of glass 48 while the second portion faces the center portion of glass sheet 48 and the third portion faces the bottom portion of the glass sheet 48 when the glass sheet is mounted on the fixture for inspection.

Each region of the inspection fixture has associated with it three potentiometers. The potentiometers face different points in the selected glass sheet region to provide a deviation value for the respective points. The deviation values are used to calculate radius of curvature for the selected glass sheet region. Table I correlates the regions of the inspection fixture 13 or glass sheet 48 with the potentiometers associated with the regions, the portions of the glass sheet associated with the regions, the reference temperatures of the heat-softened glass sheet portions associated with the regions, and the composite temperatures associated with the respective portions. The composite temperature will be defined later.

from each of the potentiometers 30–45 are recorded to determine the deviation of the shaped sheet from the reference surface at each point of the glass sheet facing said potentiometers.

A close approximation of the radius of curvature error for each region of the shaped contoured sheet is determined by equation 1, which reads:

(1)
$$RCE_R = -2\left[\frac{(d_{1-R}-d_{2-R})X_{2-R}}{X_{1-R}+X_{2-R}} + \frac{(d_{3-R}-d_{2-R})X_{1-R}}{X_{1-R}+X_{2-R}}\right]\left[\frac{DRC_R}{X_{1-R}}\right]^2$$

where
$RCE_R$ is radius of curvature error in inches for a given region of the shaped contoured sheet associated with the region on the inspection fixture, such as region 51;

$d_{1-R}$ is the deviation in inches from the reference surface of a first potentiometer in the given region, such as potentiometer 31;

$d_{2-R}$ is the deviation in inches from the reference surface of a second potentiometer adjacent to the first potentiometer, such as potentiometer 32, in the given region;

$d_{3-R}$ is the deviation in inches from the reference surface of a third potentiometer adjacent to the second potentiometer, such as potentiometer 33, in the given region;

$X_{1-R}$ is the distance in inches between the potentiometers $d_{1-R}$ and $d_{2-R}$ in the given region, such as the distance between potentiometers 31 and 32;

Table I

Correlation of Potentiometer Readings with Regions, and of Regions, Reference Temperatures and Composite Temperatures with Portions

| Region of the Inspection Fixture or Sheet of Glass | Potentiometers Associated with Region | Portion of the Glass Sheet Associated with Region | Reference Temperature Associated with Portion | Composite Temperature Associated with Portion |
|---|---|---|---|---|
| 50 | 30, 31, 32 | Top Portion | $T_T$ | $CT_T$ |
| 53 | 35, 36, 37 | | | |
| 56 | 40, 41, 42 | | | |
| 51 | 31, 32, 33 | Center Portion | $T_C$ | $CT_C$ |
| 54 | 36, 37, 38 | | | |
| 57 | 41, 42, 43 | | | |
| 52 | 32, 33, 34 | Bottom Portion | $T_B$ | $CT_B$ |
| 55 | 37, 38, 39 | | | |
| 58 | 43, 44, 45 | | | |

It is arbitrary to divide the inspection fixture 13 into nine regions, and the inspection fixture may be divided into more or less regions depending on the size and shape of sheets produced. Further, there should be three potentiometers associated with a region because three points are required to determine a radius of curvature.

The inspection fixture 13 is preferably prepared to provide readings of deviation needed to calculate the radius of curvature error by positioning a master shaped sheet (not shown) onto the inspection fixture 13 to provide a reference surface, or adjusting each of the potentiometers 30–45 to said reference surface as described in the hereinabove mentioned U.S. Pat. No. 3,733,704. A sheet of glass whose shape is to be checked for conformance to the master shape is then positioned on the inspection fixture and potentiometer readings $X_{2-R}$ is the distance in inches between the potentiometers $d_{2-R}$ and $d_{3-R}$ in the given region, such as the distance between potentiometers 32 and 33; and $DRC_R$ is the desired radius of curvature in inches for the given region.

When $X_{1-R}$ equals $X_{2-R}$, equation 1 becomes equation 2, which follows:

2. $RCE_R = -(1/X_R^2)[DRC_R]^2[d_{1-R} - 2d_{2-R} + d_{3-R}]$ where
$X_R$ is the distance between adjacent potentiometers in the given region, namely, the distance between potentiometers 31 and 32 or 32 and 33.

Equation 2 can now be used to calculate the radius of curvature error for any region of the glass sheet where the potentiometers are equidistant.

Another step of this invention is to determine a composite temperature of the top portion ($CT_T$), of the center portion ($CT_C$) and of the bottom portion ($CT_B$) of the heat-softened sheet.

The composite temperature of a portion of the sheet as used herein is the sum of the weighted reference temperatures of the selected portions. The relative weights assigned to the reference temperature for each portion is based on three parameters, namely, (1) the vertical distance and direction to the temperature measuring point of the given portion from the vertical center of a line connecting each point that faces a potentiometer used to provide a deviation value used to calculate radius of curvature for each selected region in said portion, and (2) and (3) the vertical distance and direction from said vertical centers of said regions of said portion to the temperature measuring point of each other portion.

The composite temperature for the top, center and bottom portions may be represented as equations 3, 4 and 5, respectively.

3. $CT_T = AT_T + BT_C + DT_B$ where A, B and D are coefficients expressed as percent of the reference temperature of the top portion ($T_T$), the reference temperature of the center portion ($T_C$) and the reference temperature of the bottom portion ($T_B$), respectively, that are used to calculate the composite temperature of the top portion ($CT_T$).

4. $CT_C = ET_T + FT_C + GT_B$ where E, F and G are coefficients expressed as percent of the reference temperature of the top portion ($T_T$), the reference temperature of the center portion ($T_C$) and the reference temperature of the bottom portion ($T_B$), respectively, that are used to calculate the composite temperature of the center portion ($CT_C$).

5. $CT_B = HT_T + MT_C + NT_B$ where H, M and N are coefficients expressed as percent of the reference temperature of the top portion ($T_T$), the reference temperature of the center portion ($T_C$) and the reference temperature of the bottom portion ($T_B$), respectively, that are used to calculate the composite temperature of the bottom portion ($CT_B$).

The values of the coefficients A, B, D, E, F, G, H, M and N can be determined theoretically or empirically. Consider the determination of coefficients A, B and D of equation 3, which consideration is similar to that used to evaluate coefficients E, F and G of equation 4 and coefficients H, M and N of equation 5. When the temperature measuring point for the top portion has a vertical coordinate at a minimum vertical distance from the vertical center of the line for region 50, 53 or 56 of points that face the potentiometers used to determine radius of curvature error in said regions 50, 53 and 56 when the sheet is mounted on the checking fixture, the value of coefficient A is large. Coefficient A decreases and coefficient B increases as the temperature measuring point of the center portion moves closer vertically to said vertical centers. Coefficient D is usually negligible in computing the composite temperature of the top portion because the vertical distances from the temperature measuring point of the bottom portion to said vertical centers is much greater than the corresponding vertical distances to the temperature measuring points of the top and center portions.

The sum of coefficients A, B and D should equal unity or 100 percent. Likewise, the sum of coefficients E, F and G of equation 4 and that of coefficients H, M and N of equation 5 also should equal 100 percent.

The values of coefficients E, F and G in equation 4 are determined in a similar manner, except that they are based on the respective distances and directions involving the various temperature measuring points and the vertical center of the lines connecting the points facing the potentiometers for calculating radius of curvature for regions 51, 54 and 57. The values of coefficients H, M and N of equation 5 are likewise determined in a similar manner except that the vertical distances and directions used to determine these values are those measured to the temperature measuring points of the various portions of the sheet from the vertical center of the lines connecting the points facing the potentiometers used to provide data for determining radius of curvature error in regions 52, 55 and 58.

The lines connecting the potentiometer-facing points may be either straight (for example 35, 36, 37) or curved (42, 43, 44).

The composite temperature for each portion provides a more direct correlation with radii of curvature of regions comprising the portion than the reference temperature of the portion.

In controlling production of curved automobile sidelights, it is preferred to select a temperature measuring point for the top portion as near the top edge as feasible, one for the bottom portion as near the bottom edge as feasible and one for the center portion as close to the center of the sheet measured in its vertical direction as possible.

For patterns known as NAGS D-4725 and D-4726, an automobile sidelight having a radius of curvature of about 43 inches and having a length of approximately 21 inches along one longitudinal edge, increasing to approximately 29 inches at a distance of approximately 7 inches from said edge and decreasing to about 17 inches along the opposite longitudinal edge, a distance between longitudinal edges of approximately 22 inches and a nominal thickness of 7/32 inch and composed of float glass, the coefficients for equations 3, 4 and 5 have been determined to be those shown in equations 6, 7 and 8, respectively.

6. $CT_T = .8T_T + .2T_C + OT_B$
7. $CT_C = .1T_T + .8T_C + .1T_B$
8. $CT_B = OT_T + .2T_C + .8T_B$

Another step in the method of this invention is to determine a composite temperature for each region such that the radius of curvature error for each region is reduced to zero, or at most, a value sufficiently low to assure an operator that the sheet curvature is within a tolerance accepted by the customer. This step of the method may best be explained by an example. Table II, which follows, shows typical radius of curvature errors in inches for regions of a glass sheet pattern and composite temperature for each portion associated with the respective regions.

Table II

Correlation of Regional Radius of Curvature Errors With Composite Temperatures for Portions of a Typical Pattern

| Region | Radius of Curvature Error for Region | Portion | Composite Temperature for Portion |
|---|---|---|---|
| 50 | 3 inches | ( | |
| 53 | −2 inches | ( Top | 1192°F. |
| 56 | 1 inch | ( | |
| 51 | 4 inches | ( | |
| 54 | 2 inches | ( Center | 1196°F. |
| 57 | 1 inch | ( | |

Table II-Continued

Correlation of Regional Radius of Curvature Errors With Composite Temperatures for Portions of a Typical Pattern

| Region | Radius of Curvature Error for Region | Portion | Composite Temperature for Portion |
|---|---|---|---|
| 52 | 3 inches | ( | |
| 55 | 1 inch | ( Bottom | 1198°F. |
| 58 | 1 inch | ( | |

Figure 2:
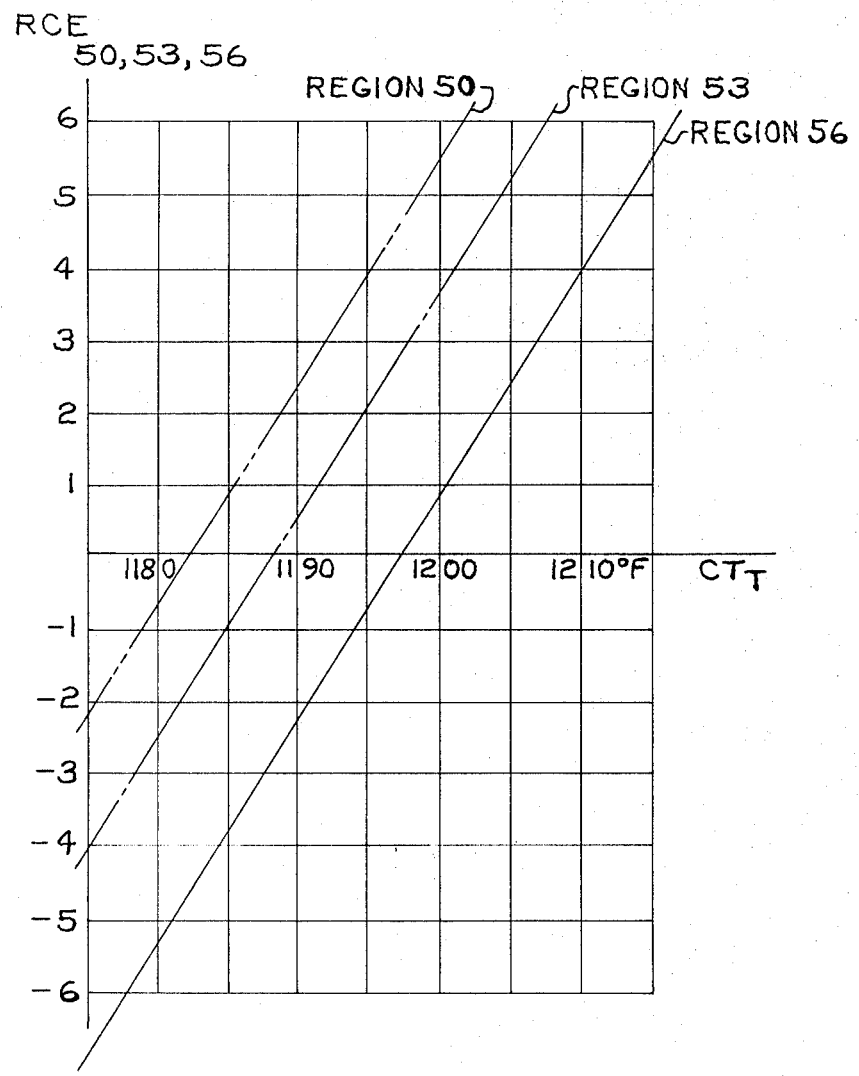
FIGS. 2 to 4 are charts illustrating the relation of radius of curvature error to composite temperature for different regions of the top, center and bottom portions, respectively, of a typical production pattern of glass sidelights.
Figure 3:
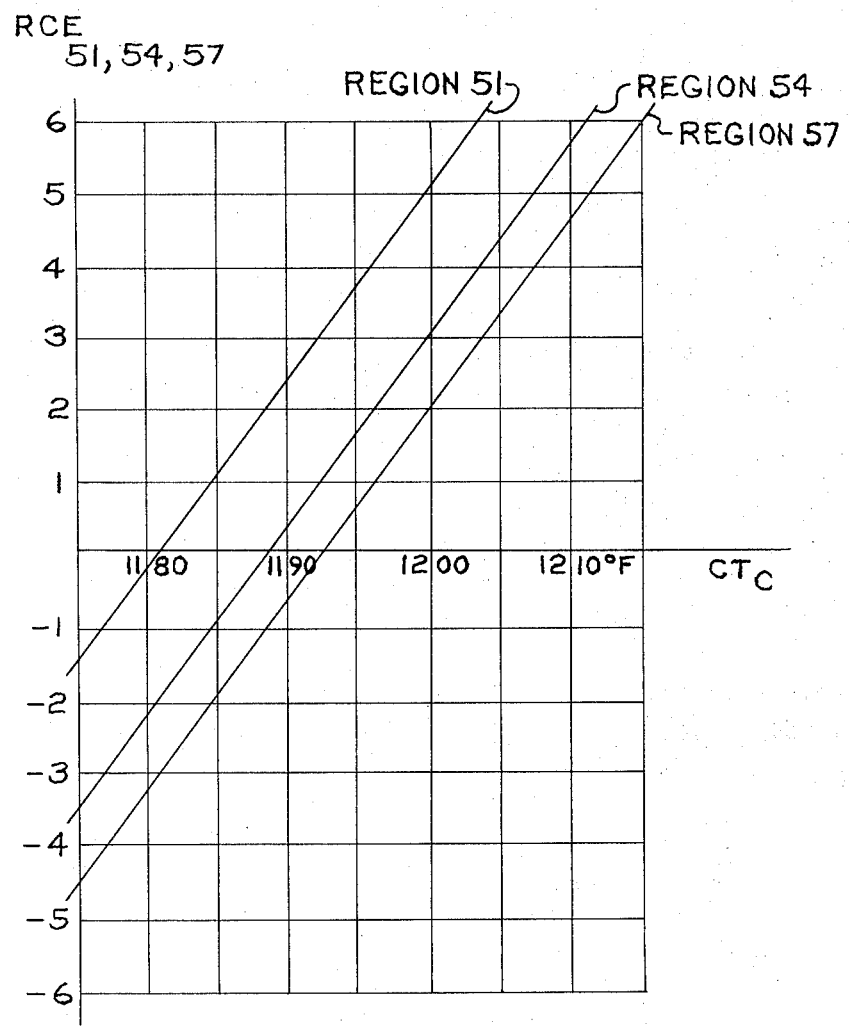
Figure 4:
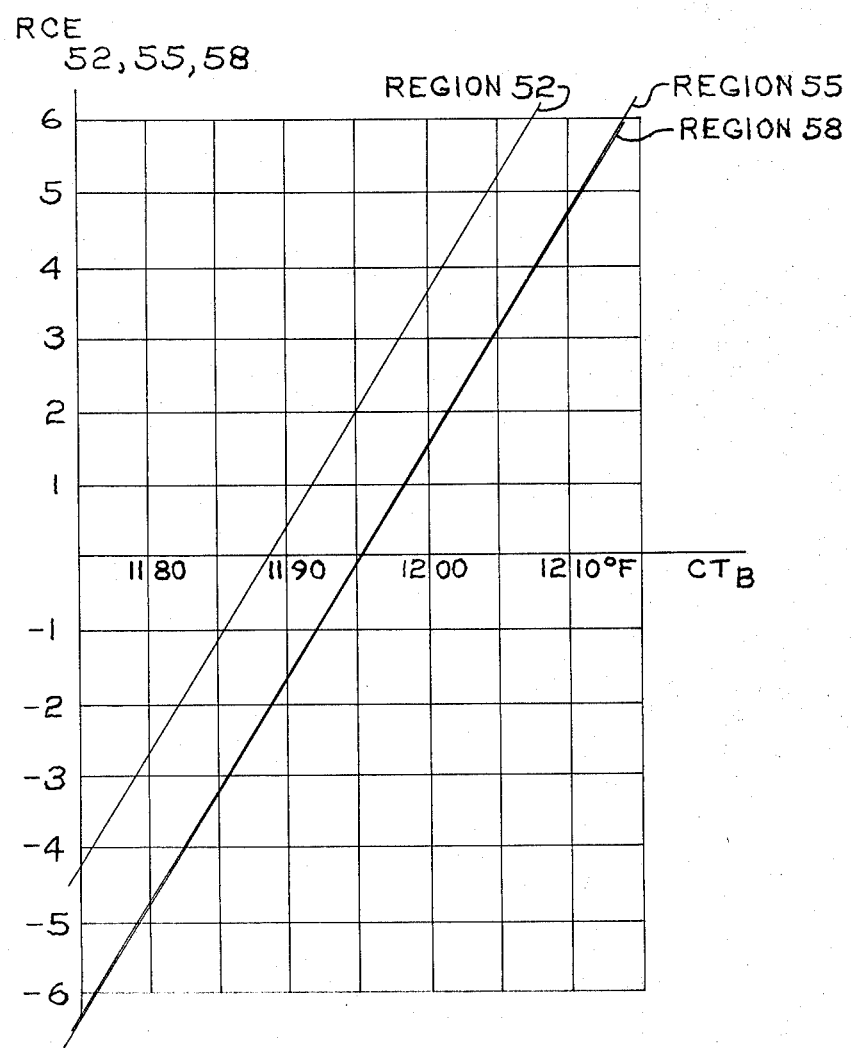

Referring to FIGS. 2 to 4, FIG. 2 plots the radius of curvature errors for regions 50, 53 and 56 at different composite temperatures for the top portion, FIG. 3 plots the radius of curvature errors for regions 51, 54 and 57 at different composite temperatures for the center portion, and FIG. 4 plots the radius of curvature errors for regions 52, 55 and 58 at different composite temperatures for the bottom portion. A preferred method for determining a selected composite temperature at which the radius of curvature error is reduced to an acceptable value will be explained for regions 50, 53 and 56 of the top portion of the sheet in question based on data of the type compiled in FIG. 2. Similar methods are used to choose a selected composite temperature associated with an acceptable value of radius of curvature error for regions 51, 54 and 57 of the center portion based on data of the type compiled in FIG. 3, and for choosing a selected composite temperature associated with an acceptable value of radius of curvature for regions 52, 55 and 58 of the bottom portion based on data of the type compiled in FIG. 4.

FIGS. 2 to 4 show a series of straight lines whose slope was determined from data compiled over several months from data comparing the radius of curvature error for each of three regions in the top, center and bottom portions, respectively, with the composite temperature for the respective portions of the mirror image patterns known as NAGS D-4725 and D-4726. The slope of each line in any given region was determined to approximate 0.3 inch change in radius of curvature error for each degree Fahrenheit change in composite temperature of the associated portion. For a narrow range of temperatures near the operating furnace temperature, empirical data have each line to be approximately straight. Furthermore, it has been found that for several other sidelight patterns tested, lowering the composite temperature of a given portion by one degree Fahrenheit within said temperature range causes the radius of curvature error to decrease approximately 0.3 inch in each region of said portion.

The slope of the lines may vary depending on the particular type of glass, the glass thickness, the contour of the pattern and various other factors. Furthermore, the slope of the line may vary for different regions in the same portion of the glass. Therefore, a rate of change in radius of curvature error of 0.3 inch per degree Fahrenheit change in composite temperature is not intended to limit the instant invention, but is presented by way of illustration of a preferred embodiment for a particular group of sidelight patterns tested.

The graphs contained in FIGS. 2, 3 and 4 were developed from data contained in Table II and the slope determined from the months of experimentation mentioned previously. Note that each line for each region crosses the axis of zero radius of curvature error at a composite temperature for the portion comprising said region. The different regions may have zero radius of curvature error at the same or different composite temperatures for said portion. The graphs also show the radius of curvature error for each selected region for composite temperatures of said portion within a stated temperature range. The composite temperatures at which the regions 50, 53 and 56 have a radius of curvature error of zero may be determined from FIG. 2. In like manner, the composite temperature of the center portion and bottom portion at which the radius of curvature error of regions 51, 54 and 57, and 52, 55 and 58 is zero may be determined from FIGS. 3 and 4, respectively.

Another step in the method of this invention is to determine which composite temperature to select for each portion. The term "selected composite temperature", as used herein, is the composite temperature of a selected portion at which one or more regions thereof have a desired radius of curvature error.

For example, with reference to FIG. 2, it may be desired to lower the radius of curvature error of region 53 to zero. From FIG. 2, the radius of curvature error for region 53 is zero at a composite temperature of 1188°F. Also, the radius of curvature errors of regions 50 and 56 can also be determined at 1188°F. to approximate +1.8 and −2.7 inches, respectively.

In certain instances, it may be possible to reduce the radius of curvature error of all the regions in a portion. A composite temperature of a portion needed to change the radius of curvature error for all the regions in the portions in a desired direction can be selected from FIGS. 2 to 4. In most instances, however, the radius of curvature error may be in one sense for one or more regions and zero or in the other sense for the remaining regions. In such cases, a composite temperature is selected that reduces the net effect of all the errors.

One procedure that has proven satisfactory for optimizing the contour of a glass sheet involves calculating the sum of the squares of the radius of curvature errors of the selected regions in the selected portions using equation 9, which follows:

9. $\epsilon (RCE_P)^2 = (RCE_{R1})^2 + (RCE_{R2})^2 + (RCE_{R3})^2$ where $\epsilon (RCE_P)^2$ is the sum of the squares of the radius of curvature errors of the regions of a given portion and $(RCE_{R1})$, $(RCE_{R2})$ and $(RCE_{R3})$ are the respective radius of curvature errors in the different regions (R1, R2 and R3) included in said given portion. While equation 9 is shown for calculations involving three regions in a selected portion, it is understood that the calculation may involve fewer or more regions, as desired.

Figure 5:
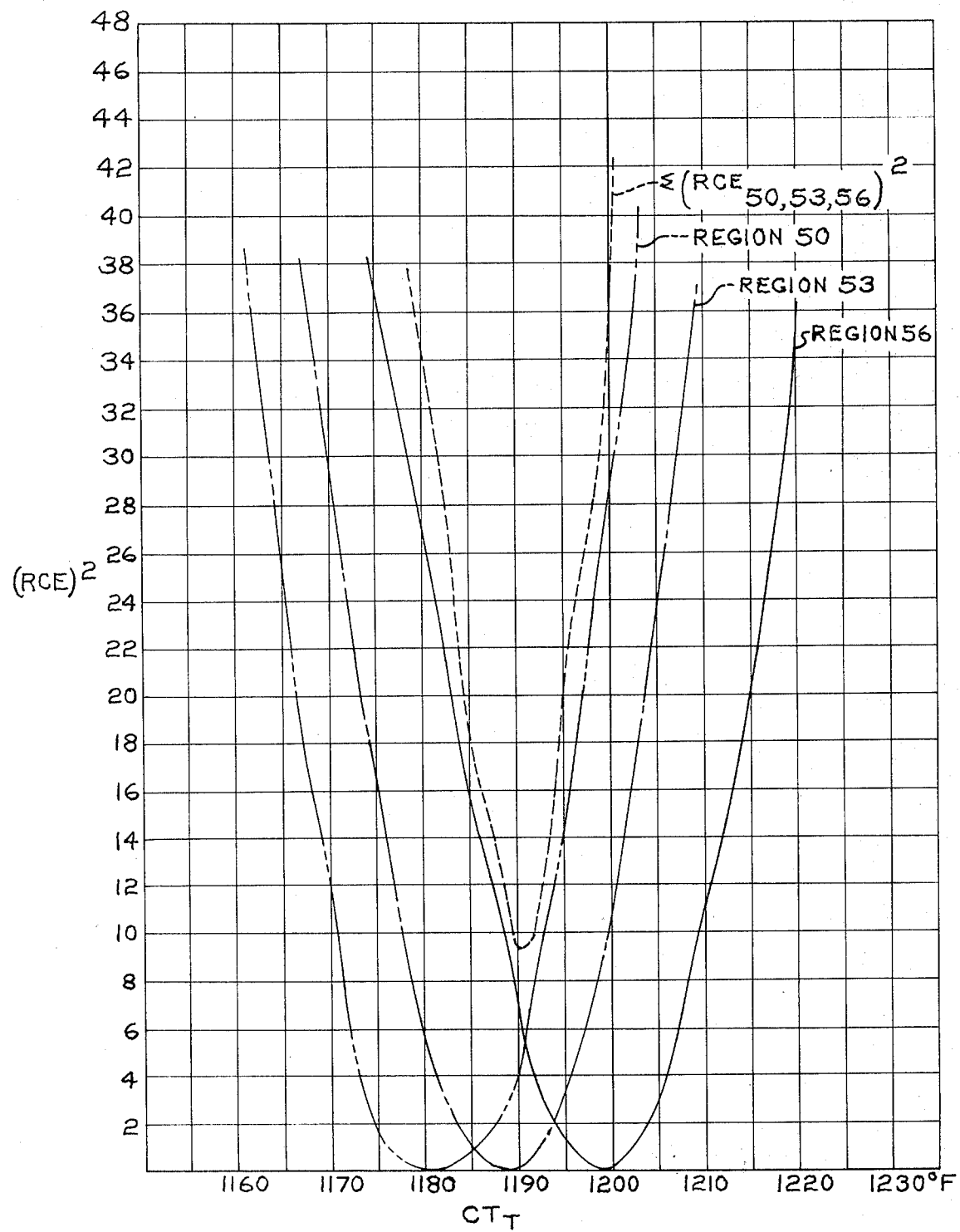
FIG. 5 is a chart useful in performing a step of the method of this invention to choose a selected composite temperature for a portion of a shaped sheet.

FIG. 5 shows a graph having three solid line parabolic curves, one developed for each region 50, 53 and 56 of a top portion of a shaped sheet. The curve for each region was developed by plotting the square of the radius of curvature errors of said region as a function of composite temperature of the top portion of said sheet. A discontinuous curve was generated by plotting the sum of the squares of the radius of curvature errors of the regions 50, 53 and 56 against composite temperature of said portion. The composite temperature at which the sum of the squares of the radius of curvature errors is at a minimum is usually selected as a target temperature for succeeding sheets undergoing processing.

Similar procedures should be used to choose a selected composite temperature for the center portion ($CT_C$) from corresponding data relating to the center portion and its regions 51, 54 and 57, and for that of the bottom portion ($CT_B$) from corresponding data relating to the bottom portion and its regions 52, 55 and 58.

Using equations 6, 7 and 8, and having chosen the selected composite temperatures, $CT_T$, $CT_C$ and $CT_B$, for the top portion, the center portion and the bottom portion, one can determine a target temperature for each of the respective portions of the heat-softened sheet at the temperature sensing station near the exit of the furnace at which subsequently shaped sheets will have a desired reduction of net effect of radius of curvature errors. These are $TT_T$ for the target temperature of the temperature measuring point for the top portion, $TT_C$ for the target temperature of the temperature measuring point for the center portion and $TT_B$ for the target temperature of the temperature measuring point for the bottom portion.

Adjustments to the furnace are determined by subtracting the target temperatures $TT_T$, $TT_C$ and $TT_B$ from the reference temperatures $T_T$, $T_C$ and $T_B$ determined by the moving average of the latest three temperature determinations at the respective temperature measuring points. The difference between these values determines the change in furnace operation (that is, change in speed of sheet movement through the furnace and/or change in thermal input that should be made to respective heating elements of the furnace) to give the desired radius of curvature errors in selected regions of subsequently shaped sheets.

One can determine from FIG. 5 a composite temperature at which the net effect of radius of curvature errors is a minimum for the top portion. The selected value for net effect of radius of curvature errors is usually more than said minimum net effect and is consistent with the tolerance permitted by the customer. Charts similar to FIG. 5 can be prepared in a similar manner to help choose selected composite temperatures for the center and bottom portions of a production pattern.

The sequence of steps may be changed, and one or more steps of the method of this invention may be modified without deviating from the gist of this invention.

For example, in certain instances, changing a parameter on the basis of radius of curvature errors from a single sheet may not be sufficiently representative of the production operation to compensate for inherent variables such as temperature cycling of the heating elements in the furnace and variations in thickness of the glass sheets treated, for example. In those instances, additional sheets may be selected for determination of the radius of curvature errors for selected regions as will their reference temperatures. It may become desirable to obtain an average radius of curvature error for each region. The moving average or radius of curvature errors for the selected regions and the selected composite temperatures for the selected portions would then be used to construct graphs for each selected region in each selected portion such as those shown in FIGS. 2 to 4. The procedure for choosing the selected composite temperature for each selected portion, the target temperature for the top, center and bottom portions, and the other steps previously described including adjustments to the heating elements of the furnace are as previously discussed, except that they are determined from considerations based on moving average data relative to additional selected parameters.

Furthermore, a computer may be advantageously programmed to accelerate the calculating steps of the invention and, if desired, calculate adjustments needed for the speed of glass sheet movement and/or energy imparted to the heating elements of the furnace to provide radius of curvature errors of a desired magnitude.

In addition, the process of shaping glass sheets may be continually monitored. In this instance, after a predetermined group of data has been accumulated, as additional data are added, the earliest data are dropped. Maintaining control of the process based on new data provides a more representative analysis of the process. Changes in the heating elements of the furnace can be made based on the latest data. However, as can be appreciated, the time period at which the furnace is adjusted should be sufficient to allow the heating pattern of the furnace to stabilize. In other words, changes in power supplied to individual heating elements of the furnace should be made at time intervals sufficiently long that the furnace has stabilized after a previous adjustment.

What is claimed is:

1. In a method of controlling the radius of curvature of at least one region of a shaped thermoplastic sheet wherein the method of shaping the thermoplastic sheet includes the steps of heat-softening the thermoplastic sheet, measuring a reference temperature at a temperature sensing station of at least one portion of the heat-softened sheet having the at least one region, and shaping the sheet, the improvement comprising:
   determining a radius of curvature error for the radius of curvature defined by at least three selected points on said sheet related to said at least one region of the shaped sheet;
   determining a composite temperature for said at least one portion;
   determining a target temperature for portions of subsequently heat-softened sheets corresponding to the at least one portion having the at least one region to provide the at least one region of subsequently shaped sheets with a desired radius of curvature error wherein the target temperature is a function of the desired radius of curvature error of the at least one region of the shaped sheet and the composite temperature for the at least one portion; and
   heating the at least one portion of subsequent sheets to a reference temperature as measured at the temperature sensing station which reference temperature of subsequently heat-softened sheets is approximately the target temperature.

2. The improved method as set forth in claim 1 wherein said step of determining radius of curvature error is accomplished by:
   measuring deviation of selected points in the at least one region in a top portion, center portion and bottom portion of the shaped sheet from a desired radius of curvature for each of the at least one region; and
   determining radius of curvature error for the at least one region in the top, center and bottom portions from the deviation values measured at the selected points in the at least one region in the top, center, and bottom portions, respectively.

3. The improved method as set forth in claim 1 wherein the thermoplastic sheet is a glass sheet.

4. The improved method as set forth in claim 1, including the steps of:
measuring a reference temperature of a top portion, center portion and bottom portion of the heat-softened sheet at the temperature sensing station;

determining a radius of curvature error of at least one region in each of the portions of the shaped sheet;

determining a composite temperature for each of the portions of the shaped sheets;

determining a target temperature for top portion, center portion and bottom portion of subsequently heat-softened sheets to provide the at least one region in each of the portions of subsequently shaped sheets with a desired radius of curvature error wherein the target temperature is a function of the desired radius of curvature error for the at least one region of each of the portions and the composite temperature for each of the portions; and heating the top, center and bottom portions of subsequent sheets to a reference temperature measured at the temperature sensing station which reference temperature of the subsequent heat-softened sheets approximates the target temperature of the top portion, center portion and bottom portion.

5. The improved method as set forth in claim 4, wherein said step of determining radius of curvature error comprises:
determining a desired radius of curvature for said three selected points for the at least one region in each of a top portion, a center portion and a bottom portion of the shaped sheet; and measuring the deviation of said selected points in each said at least one region in said top, center and bottom portions.

6. In a method of shaping thermoplastic sheets comprising applying heat to a sheet to soften said sheet; shaping the heat-softened sheet into a desired shape, and measuring the deviation of said sheet from a reference surface at selected points on the shaped sheet, the improvement comprising:
determining the radius of curvature defined by at least three of said selected points related to at least one predetermined region of the shaped sheet;

determining the error of the determined radius of curvature for each said predetermined region, the said error being the difference between the determined radius of curvature and the desired radius of curvature for each said region; and adjusting the amount of heat applied to subsequent thermoplastic sheets by an amount sufficient to reduce the said error of the determined radius of curvature in corresponding predetermined regions of subsequently shaped sheets.

7. The improved method as set forth in claim 6 wherein the thermoplastic sheet is a glass sheet.

8. The improved shaping method as set forth in claim 6, wherein the step of applying heat to a sheet is accomplished by exposing the sheet to a high temperature atmosphere having a predetermined heat pattern, further including the steps of:
determining a composite temperature for a selected portion of the heat-softened sheet that includes said at least one predetermined region;

determining a selected composite temperature for said selected portion so that heating a corresponding portion of subsequent sheets to the selected composite temperature provides said at least one predetermined region of subsequently shaped sheets with a desired radius of curvature error; and said adjusting step includes the step of:
altering the predetermined heat pattern to which subsequent sheets are exposed so that the composite temperature of the portion of subsequently heated sheets corresponding to said selected portion is approximately the selected composite temperature.

9. The improved shaping method as set forth in claim 8, wherein the selected composite temperature for said selected portion is a composite temperature at which the radius of curvature error of said at least one predetermined region of subsequently shaped sheets is zero.

10. In a method of minimizing the radius of curvature error of a shaped thermoplastic sheet wherein the sheet is displaced through a furnace to heat soften the sheet and subsequently shaped, the improvement comprising:
1. measuring the temperature at a top portion of a first heat-softened sheet at a temperature sensing station;
2. measuring the temperature at a cneter portion of a second heat-softened sheet at the station;
3. measuring the temperature at a bottom portion of a third heat-softened sheet at the station;
4. repeating each of the previous steps at least twice on the next succeeding sheets;
5. determining an average temperature from the measured temperatures for each of the top, center and bottom portions;
6. determining a composite temperature for the top, center and bottom portions from the average temperatures;
7. determining a radius of curvature error for the radius of curvature defined by at least three selected points related to at least one region in each of the top, center and bottom portions of a shaped sheet selected from the sheets of steps 1–4;
8. selecting a composite temperature for each portion of subsequently heat-softened sheets which is associated with a selected radius of curvature error in the region in each of the portions;
9. determining a target temperature for each of the top portion, center portion and bottom portion from the composite temperatures selected in step 8; and
10. adjusting the furnace to heat the top, center and bottom portions of subsequent sheets to reference temperatures as measured at the station which reference temperatures approximate the target temperatures determined in step 9.

11. The method as in claim 10, including the step of: repeating said steps (1) to (10) on a predetermined schedule.

12. The improved method as set forth in claim 10 wherein the thermoplastic sheet is a glass sheet.

* * * * *